Figure 1:
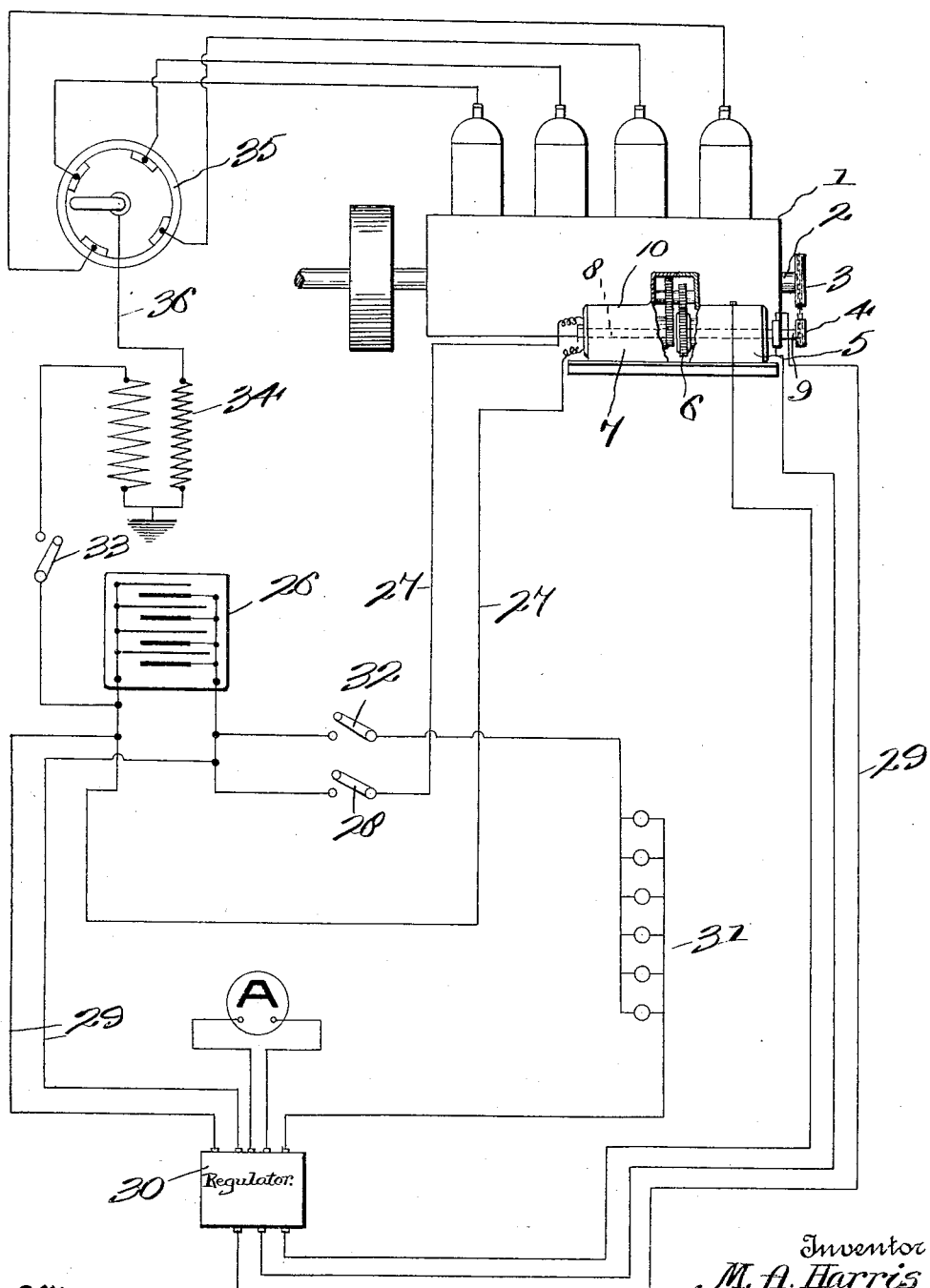

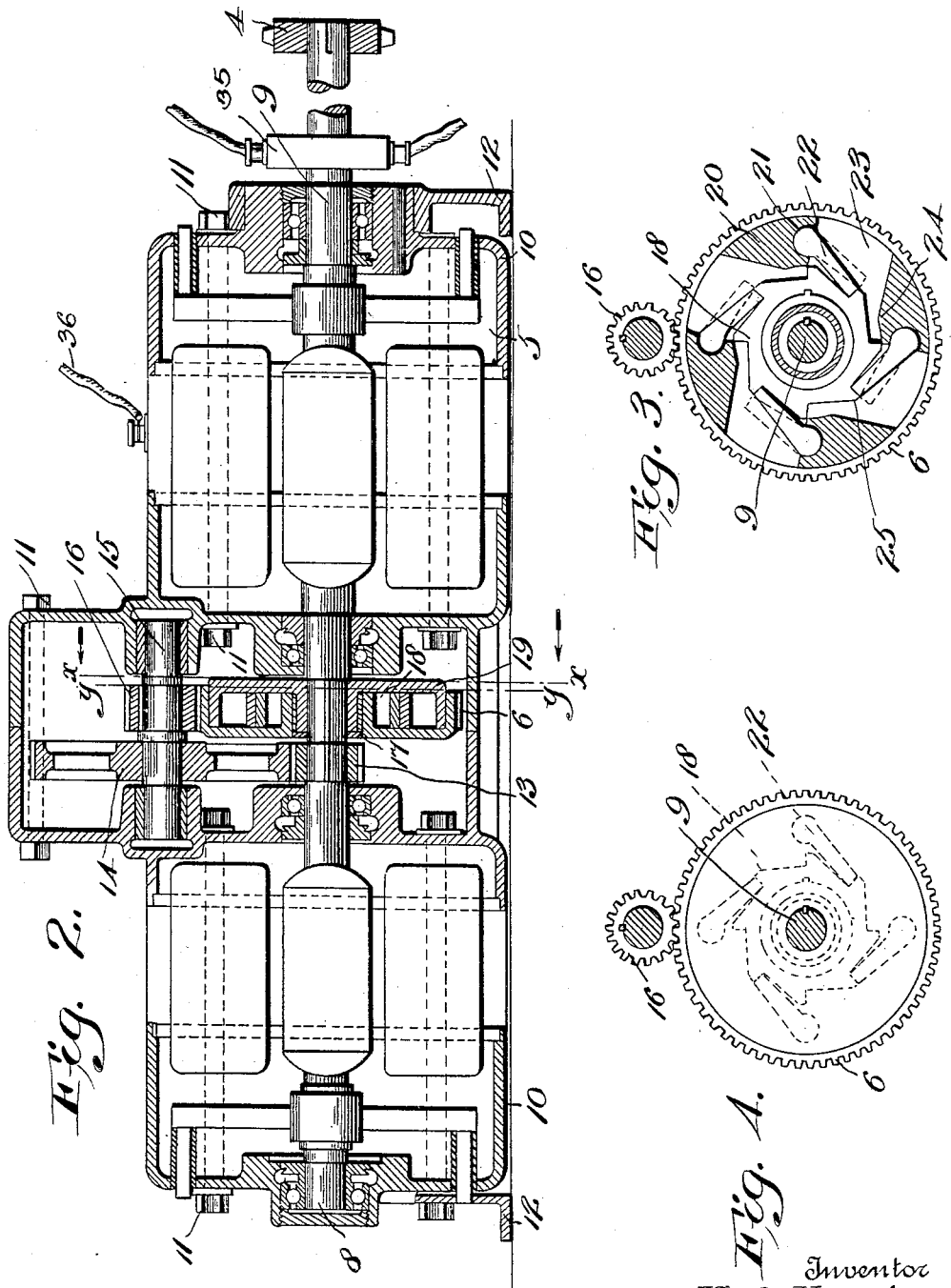

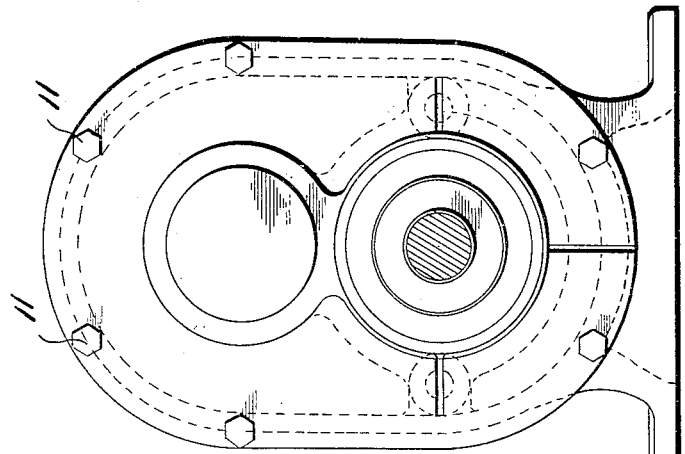
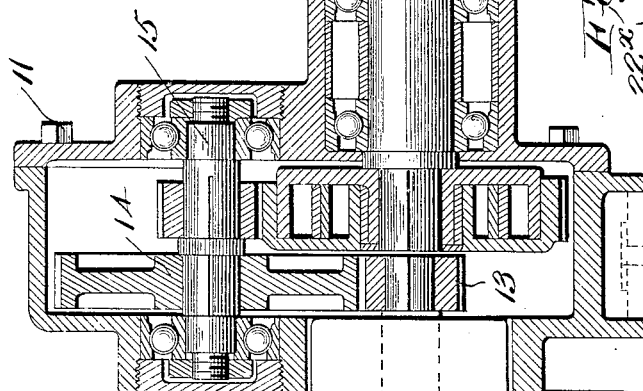
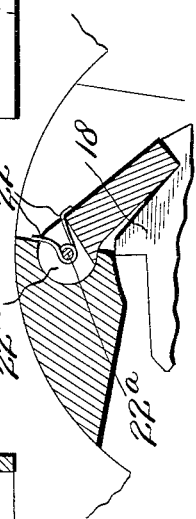

UNITED STATES PATENT OFFICE.

MOSES A. HARRIS, OF WESTFIELD, NEW JERSEY, ASSIGNOR OF ONE-THIRD TO LAWRENCE A. CLARK, OF WESTFIELD, NEW JERSEY.

STARTER FOR ENGINES.

1,157,533.  Specification of Letters Patent.  Patented Oct. 19, 1915.

Application filed November 21, 1913.  Serial No. 802,277.

*To all whom it may concern:*

Be it known that I, MOSES A. HARRIS, a citizen of the United States, residing at Westfield, in the county of Union and State of New Jersey, have invented certain new and useful Improvements in Starters for Engines; and I do hereby declare the following to be a full, clear, and exact description of the invention, such as will enable others skilled in the art to which it appertains to make and use the same.

My invention relates to a starter for engines or power generators, particularly of the kind known as explosion engines, wherein a charge of compressed gas and air must be exploded before any power can be produced, and especially to a switch controlled electric motor for turning over the engine shaft at the start, until the engine acquires sufficient velocity to go on. An efficient apparatus must start the engine promptly and with certainty, and to effect this it should be able to turn the engine shaft at least one hundred times a minute for a brief period. Hitherto, in devices of this kind, various objections and difficulties have been found. It is hard to design a satisfactory machine which is both electric motor and generator. In the first place, it requires two separate systems of wiring in the armature, requiring two speeds of rotation, one a low one when the device is run as a generator, and the other a high one when run as a motor. This involves, usually, a more or less elaborate and delicate system of levers, sliding connections, wiring, etc., to the constant efficiency of all of which the rough use to which an automobile is subjected, does not conduce. Another type rotates a motor with its speed reducing and transmission gearing located at the fly wheel of the engine and a generator located at some other convenient place and driven independently by belt or gear. These also require devices to shift them in and out of gear.

In my apparatus I provide a motor, a battery for driving the motor, a generator for charging the battery, a speed reducing connection between the shaft of the motor and that of the generator, and permanent gearing between the shaft of the generator and the engine shaft. This enables the motor to turn the engine shaft at an appropriate speed. If now during the working of the engine the generator shaft were to attempt to turn the motor shaft the speed would be multiplied, and the construction and working impracticable, if not impossible. I, therefore, provide in the gearing connecting the motor and generator shafts a release gear of such a nature that it engages when the motor is doing the driving, and runs free when the generator is driven by the engine. This enables me to use independent units as motor and as generator, to keep the connection between the generator and the engine permanent, and has various other advantages.

I have illustrated my invention in the accompanying drawing, in which:—Figure 1 illustrates a layout of the wiring and controlling agencies. Fig. 2 a sectional view of the motor and generator with the gearing connecting them. Fig. 3 a section on the line *y—y* of Fig. 2. Fig. 4 a section on the line *x—x* of Fig. 2; Figs. 5 and 6 sectional and end views of a modified form, and Fig. 7 an enlarged view of the pawl in section.

In the drawing, Fig. 1, 1 represents an engine, here indicated with four cylinders, 2 the shaft thereof, on which I have shown a sprocket wheel 3. This wheel is in gearing engagement with a small wheel 4 on the shaft of the generator 5, a sparking commutator 35 with the usual wires, is provided for the generator 5. On the remote end of the generator shaft is a gear wheel 6, which is in train with other gearing, and is connected to the shaft of the motor 7.

I have indicated at 36 one of the wires to the field of the generator, which may be of any usual type.

It will be noted, Fig. 2, that the shaft 8 of the motor is substantially in line with the shaft 9 of the generator; both shafts turn in suitable bearings, here shown as ball bearings, and being inclosed in casings 10, are held together, as here shown, by bolts 11 and provided with suitable supports 12. Various changes in the representation just indicated may be made, and the casing, instead of being bolted together, may be made in one piece practically, and the two shafts need not necessarily be in line. Of course, instead of the sprocket gearing other forms of gearing may be provided. On the right hand end of the shaft 8 is fixed pinion 13 which engages with gear wheel 14 on shaft 15, and on the right of the same shaft 15 is pinion 16 secured thereto, and this pinion engages with gear wheels 6, previously referred to. The shaft 15 is provided with suitable bearings and shoulders on the shaft, and keys for fastening the gears in place are obvious and need not be described.

The gear wheel 6 is made cup-shape in general contour, and is provided, at its center, with a boss 17, on which is mounted ratchet wheel 18 to turn therewith. Designed to fit snugly within the cup-shaped wheel 6 is the pawl-carrying member 19, which, as shown, consists of a cup-shaped member necessarily of smaller diameter provided with a hub and key to engage the shaft of the generator, and also provided, near its circumference, with a number of abutments 20, shaped as shown in Fig. 3, and provided with half rounded seats 21 concentric with shafts 22$^a$. In each of these seats is located the butt or turning end of a pawl 22, the other end of which is adapted for engagement with the teeth of the ratchet wheel. Sufficient space, 23, between successive abutments is left for the free play of the pawl.

It will be noted that the near side of each abutment is rounded off, all on the same radius, at 24, and this radius corresponds to the exterior periphery of the ratchet wheel, the teeth of which are also shown slightly rounded at 25, so that the pawl-carrying member turns as it were upon the ratchet wheel, or with relation thereto, and the pawls are kept in engagement with the ratchet and in the same vertical plane as the ratchet wheel by springs 22$^1$, in slots 22$^x$ in each pawl butt, and coiled about each pawl shaft or axis 22$^a$, as shown in Fig. 7, while free rotation in one direction between these members is provided. Any rotation in the other direction cannot be effected, because the pawls will slip over the ratchet. The springs 22$^1$ are light and when the shaft 9 of the generator becomes actuated at the full speed of the engine, it is to be noted that the heavy pawls 22 will be swung by centrifugal force in their seats toward the periphery of the pawl-carrying member, against the pressure of the springs, and noise and chatter will thereby be avoided. From this it happens that any rotation of the motor shaft is at once transmitted to the generator shaft and thence to the engine shaft, while the reverse cannot occur.

Passing now to Fig. 1, 26 is a storage battery, and from the poles of this battery wires 27 lead to the field coils of the motor 7, the control being in a suitable means, here indicated as a switch 28. From the generator wires 29 pass through the regulator 30 to the battery. I have indicated a regulator at 30. In this regulator I may place an automatic device for cutting off the current or short circuiting the field when the battery becomes fully charged; and also devices whereby automatically or at will the lamp circuit 31 may be placed directly in the generator circuit or directly in the storage battery circuit in series or in multiple. I have shown a switch 32 for controlling the circuit from the battery to the lamp. I have also shown a switch 33 for controlling a circuit to the induction coils 34. Leading to a commutator 35 is a wire 36, and from this commutator wires lead to the various cylinders.

In Fig. 5 I have shown the release gearing connected through a sprocket (a gear might, of course, be used) to the engine shaft. This does away with the generator shaft at this point, and permits the generator to be located, if desired, somewhere else on the chassis.

It will be seen that, by my device, which I have shown and described above, I have provided a simple and efficient means whereby the driver, say of an explosion engine, may the switches being properly moved by simply pressing a button cause the motor to turn over the shaft and cause the sparking to begin, while, after the engine has obtained its speed, the generator will generate energy and will store it in the storage battery. It will be noted, of course, that when the shaft of the generator is rotated by the reduction gear from the rotating shaft of the motor, a feeble current will be generated in the course of the field coils of the generator. The rotation of the shaft is so slow, however, that this current is so small as to be negligible and harmless.

While I have typified my invention as applying to an electric starter, it is obvious that the same probably could be applied to others, as, for instance, pneumatic starting devices for automobiles, motor boats, etc.

What I claim as new and desire to secure by Letters Patent is:

1. In an engine starter, the combination of an engine shaft, a generator connected to said engine shaft, a motor, gear connections between said motor and generator shafts including an element comprising a pair of flanged members having their flanges fitted together to provide an inclosing casing, a ratchet mounted in one part of said casing, and pawls coöperating with said ratchet and pivoted in the complemental part of the casing.

2. In an engine starter, the combination of an engine shaft, a generator connected to said engine shaft, a motor, gear connections between said motor and generator shafts including an element comprising a pair of interfitted cup-shape members, and a one-way driving connection between said members and inclosed thereby.

3. In an electric starter for automobile engines, an engine shaft, a motor, a generator in line with the motor, a gear connection between the shaft of the motor and the shaft of the generator, said connection including as one member, a two-part casing, one part fitting over the other, a series of abutments, with rocking recesses therein provided in the inner fitting part, pawls with rocking butts seated in said recesses, said abutments being also provided with a series of internal curved ways all on the same radius, a ratchet wheel having exterior bearing surfaces fitting said curved ways, ratchet teeth between said bearing surfaces, and in the plane of the pawls, whereby said casing and ratchet may turn freely in bearing relation in one direction but not in the other, and gearing between the generator and engine shaft.

4. In an electric starter for automobile engines, an engine shaft, a motor, a generator, a train of gears between the shaft of the motor and the shaft of the generator, a two-part casing, one part fitting over the other, the periphery of the outer part being provided with teeth and forming one element of the gear train, a ratchet wheel secured centrally to and within said outer part, abutments within said inner part, pawls mounted on said abutments and turned so as to be engageable by the teeth of said ratchet wheel, said pawls held between the outer and inner parts of the casing, the inner part of the casing being secured to the shaft of the generator, and gearing between the generator and engine shaft.

5. In an electric starter for automobile engines, an engine shaft, a motor, a generator, a train of gears between the shaft of the motor and the shaft of the generator, a two-part casing, the parts interfitting, the periphery of the outer part being provided with teeth and forming one element of the gear train, a ratchet wheel secured centrally to and within said outer part, abutments within said inner part having pivoted pawls provided with rocking butts on said inner parts and provided with weak springs pressing therein toward the ratchet wheel, said pawls held between the inner and outer parts of the casing, the inner part of the casing being secured to the shaft of the generator, and gearing between the generator and engine shaft.

6. The combination in an electric starter for explosion engines, of an engine shaft, a motor, a generator connected to charge a storage battery for said motor, a speed reducing gearing train from the shaft of the motor to the shaft of the generator, the two shafts being in line, recessed abutments mounted on one member of the train, pawls seated in said recesses, a ratchet mounted on another member of the train and adapted for engagement by said pawls, clearance spaces for said pawls between said abutments, whereby there may be engagement between said pawls and ratchet up to a certain speed of the pawl carrying train member, beyond which speed said pawls are thrown out of engagement with the ratchet, and gearing between the generator and engine shaft.

7. The combination in an electric starter for engines, of an engine shaft, a motor, a generator adapted to charge a storage battery for said motor, a speed reducing gearing train from the shaft of the motor to the shaft of the generator, recessed abutments, mounted upon one member of said train, spring pressed pawls having their butts mounted in said recesses, a ratchet mounted on another member of the train, adapted for engagement by said pawls, clearance spaces between said abutments whereby there may be engagement between the spring pressed pawls and the ratchet up to a certain speed, beyond which speed centrifugal force causes said pawls to overcome said springs and to be thrown into said clearance spaces, and gearing between the generator and engine shaft.

8. The combination in an electric starter for explosion engines, of an engine shaft, a motor, a generator adapted to charge a storage battery for driving said motor, a gearing train connecting the shaft of the motor and that of the generator, heavy spring pressed pawls on the generator side of the gearing connection and a coöperating ratchet on the motor side of the gearing connection, the construction being such that the motor may drive the generator to turn the engine, up to a certain speed of rotation, and when the engine starts to turn the generator the pawls are flung by centrifugal force away from the ratchet, and gearing between the generator and engine shaft.

9. The combination in an electric starter for explosion engines, of an engine shaft, a motor, a generator adapted to charge a storage battery for driving said motor, a gearing between the generator shaft and the engine shaft, a speed reducing gearing train between the motor shaft and the generator shaft, the two being in line, one member of this train being provided on its inner periphery with recessed abutments, with spaces between said abutments, heavy spring pressed pawls butt-pivoted in said recesses, a ratchet in said train, on the motor side thereof, surrounded by and adapted to be engaged by said pawls, whereby the motor may through the generator and its shaft connection turn over the engine, and when the engine picks up and begins to turn the generator shaft the pawls will be swung by centrifugal force out of engagement with the ratchet and the generator shaft will turn while the motor shaft may remain idle, and gearing between the generator and engine shaft.

In testimony whereof, I affix my signature, in presence of two witnesses.

MOSES A. HARRIS.

Witnesses:
E. C. HARRIS,
J. S. CLARK.

It is hereby certified that Letters Patent No. 1,157,533, granted October 19, 1915, upon the application of Moses A. Harris, of Westfield, New Jersey, for an improvement in "Starters for Engines," were erroneously issued to the inventor said Harris and Lawrence A. Clark, as assignee of one-third interest in said invention, whereas said Letters Patent should have been issued to said Harris and said Clark *as assignee of one-half interest* in said invention, as shown by the records of assignments in this office; and that the said Letters Patent should be read with this correction therein that the same may conform to the record of the case in the Patent Office.

Signed and sealed this 16th day of November, A. D., 1915.

[SEAL.]

J. T. NEWTON,
*Acting Commissioner of Patents.*